United States Patent [19]

Arai et al.

[11] Patent Number: 4,800,133
[45] Date of Patent: Jan. 24, 1989

[54] ALUMINUM ALLOY FOIL FOR CATHODE OF ELECTROLYTIC CAPACITORS

[75] Inventors: Kozo Arai; Takao Suzuki; Syozo Umetsu, all of Osaka, Japan

[73] Assignee: Showa Aluminum Corporation, Osaka, Japan

[21] Appl. No.: 35,246

[22] Filed: Apr. 6, 1987

Related U.S. Application Data

[63] Continuation of Ser. No. 733,402, May 13, 1985, abandoned, which is a continuation of Ser. No. 305,855, Sep. 25, 1981, abandoned.

[30] Foreign Application Priority Data

Sep. 30, 1980 [JP] Japan .................. 55-137367
Sep. 30, 1980 [JP] Japan .................. 55-137368

[51] Int. Cl.$^4$ .............................................. H01G 9/24
[52] U.S. Cl. ...................................... 428/606; 148/438
[58] Field of Search ............. 428/606, 612, 613, 687; 420/529; 164/463, 482, 476, 477; 148/438

[56] References Cited

U.S. PATENT DOCUMENTS

| | | | |
|---|---|---|---|
| 3,346,424 | 10/1967 | Watters | 164/476 |
| 3,351,442 | 11/1967 | Hooper | 204/37 R |
| 3,475,289 | 10/1969 | Hunter | 428/606 |
| 4,142,571 | 3/1979 | Narasimhan | 164/463 |
| 4,214,041 | 7/1980 | Fister, Jr. | 428/607 |
| 4,274,471 | 6/1981 | Minoura | 164/463 |

FOREIGN PATENT DOCUMENTS

| | | | |
|---|---|---|---|
| 965 | 3/1979 | European Pat. Off. | 420/529 |
| 25016 | 10/1969 | Japan | 420/529 |
| 60093 | 5/1979 | Japan | 428/606 |
| 53411 | 4/1980 | Japan | 428/606 |
| 127759 | 10/1981 | Japan | 420/529 |

OTHER PUBLICATIONS

"The Relationship Between the Composition, the Structure Parameters and the Etchability of Alloyed Aluminum Cathode Foils for Electrolytic Capacitors", Van Alphen et al., Chem. Abstracts, vol. 90; 196219d, 1979.

"Properties and Applications of Wrought Aluminum Alloys", *Metal Progress*, mid-Jun. 1978, p. 88.

Woldman's Engineering Alloys, Gibbons, American Society for Metals, 6th ed, 1979, pp. 1763-1764.

*Primary Examiner*—John J. Zimmerman
*Attorney, Agent, or Firm*—Armstrong, Nikaido, Marmelstein & Kubovcik

[57] ABSTRACT

An aluminum alloy foil for the cathode of an electrolytic capacitor is produced from a continuously cast aluminum alloy plate containing 0.03 to 0.5% of copper.

10 Claims, No Drawings

ALUMINUM ALLOY FOIL FOR CATHODE OF ELECTROLYTIC CAPACITORS

This application is a continuation of application Ser. No. 733,402, filed 5/13/85, now abandoned, which is a continuation of application Ser. No. 305,855, filed 9/25/81, now abandoned.

BACKGROUND OF THE INVENTION

The present invention relates to an aluminum alloy foil for use as the cathode foil of an electrolytic capacitor which comprises an anode foil formed with a dielectric coating, a cathode foil having no dielectric coating and opposed to the anode foil and an electrolyte provided between the two foils.

Throughout the specification and the appended claims, the percentages are all by weight.

To give an increased capacitance to electrolytic capacitors of the type described, it has been practice to increase the capacitance of the anode foil through various improvements in the anode foil, and an aluminum foil having a purity of about 99.3 to 99.8% is used as the cathode foil. Such aluminum foil is produced by casting a slab from aluminum of the above-mentioned purity by a semi-continuous process, and subjecting the slab to hot rolling, then to cold rolling and to further rolling for foil forming. However, the aluminum foil thus prepared still remains to be improved in its capacitance.

To obtain a cathode foil of increased capacitance, the aluminum foil is etched to form minute indentations in its surface uniformly and with a high density and is thereby given a larger surface area. Nevertheless, when having a purity of about 99.3 to 99.8%, the aluminum foil must be etched excessively so as to have the desired capacitance. An excess of weight reduction will then result from corrosion, permitting occurrence of corrosion pits locally in the foil and consequently reducing the capacitance and mechanical strength of the foil.

SUMMARY OF THE INVENTION

The main object of this invention is to provide an aluminum alloy foil which is useful for the cathode of electrolytic capacitors and has a greater capacitance and higher mechanical strength than conventional cathode foils and which is prepared without any excessive weight reduction due to corrosion by etching. The aluminum alloy foil is produced from a continuously cast aluminum alloy plate containing 0.03 to 0.5% of copper and is superior to conventional cathode foils in respect of the above three features.

DESCRIPTION OF THE PREFERRED EMBODIMENTS

The present invention provides an aluminum alloy foil which is useful for the cathodes of electrolytic capacitors and which is prepared from a continuously cast aluminum alloy plate containing 0.03 to 0.5% of copper. The aluminum alloy foil has a high capacitance and great mechanical strength and is prepared without undergoing an excessive weight reduction due to corrosion by etching. With the continuously cast aluminum alloy, the element contained in aluminum is in the form of a solid solution supersaturated therewith, and the alloy is composed of fine and uniform crystals, so that the plate has high strength. Consequently the foil prepared from the plate also has high strength. The aluminum alloy plate is prepared by a continuous casting process, e.g. the 3C process, Hunter process or Hazelett process. For example, a melt of aluminum alloy is introduced into the space between two rotating casting rolls or a pair of running casting belts which are forcedly cooled. Thus the plate is prepared by a continuous casting-rolling process without resorting to the usual hot rolling process. The plate thus obtained is then subjected to cold rolling and foil-forming rolling steps to prepare an aluminum alloy foil. Before the foil-forming step, the continuously cast plate may be subjected to an intermediate annealing step. The copper incorporated into the plate gives an increased capacitance to the aluminum alloy foil prepared from the plate. However, if the copper content is less than 0.03%, the foil will not have an effectively increased capacitance, whereas if it is over 0.5%, a greater reduction will result from corrosion. Accordingly the copper content should be in the range of 0.03 to 0.5%, preferably 0.1 to 0.3%. The copper incorporated into the continuously cast aluminum alloy plate increases the capacitance of the resulting foil for the following reasons. As is well known, the capacitance of a foil is proportional to the surface area of the foil. To increase the surface area of the foil, the surface of the foil must be etched to form minute indentations uniformly and with a high density. With the continuously cast aluminum alloy plate containing copper, the aluminum is supersaturated with the copper forming a solid solution, and the alloy is composed of fine and uniform crystals. Additionally copper is nobler than aluminum in respect of electric potential and has a wide range of solid solubilities in aluminum. Accordingly when an aluminum alloy foil prepared from the continuously cast aluminum alloy plate is etched, minute indentations are formed in the foil surface more uniformaly with a higher density than when a copper-containing aluminum alloy foil obtained from a semi-continuously cast slab or an aluminum foil obtained from a continuously cast plate of copper-free aluminum alloy is etched. However, when the copper content of the continuously cast plate exceeds 0.5%, the foil is etched excessively and has a larger number of indentations in its surface but undergoes a marked reduction due to corrosion. Consequently the foil has a reduced capacitance.

When containing more than 0.03% of copper, the continuously cast aluminum alloy plate is likely to develop cracks. The plate can be prevented from cracking when containing titanium, but the titanium content, if less than 0.002%, is not fully effective for preventing the plate from cracking. If more than 0.05% of titanium is present, the aluminum alloy foil prepared from the plate has a lower capacitance. The titanium content should therefore be in the range of 0.002 to 0.05%, preferably 0.005 to 0.01%. Titanium also acts to give enhanced strength to the aluminum alloy foil. When the continuously cast aluminum alloy plate contains 0.002 to 0.05% of titanium, the mechanical strength only of the foil prepared from the plate can be increased without entailing a decrease in its capacitance.

To obtain an aluminum alloy foil of higher capacitance, it is preferable that the aluminum material for preparing the continuously cast aluminum alloy plate be of a purity of at least 99.7%. The higher the purity of aluminum, the greater will be the capacitance, so that it is more preferable to use aluminum having a purity of at least 99.85%.

Iron, silicon and like impurities are inevitably incorporated into the aluminum alloy foil during the production process. If containing iron and silicon in a combined amount of more than 0.3%, the aluminum alloy foil has a reduced capacitance, so that the combined content of iron and silicon is preferably not larger than 0.3%.

EXAMPLES 1-3

A plate having a thickness of up to 25 mm was prepared by a continuous casting-rolling process from each of three kinds of aluminum alloys having the compositions listed in Table 1. The plate was then cold-rolled and further rolled for foil forming to prepare two sheets of aluminum alloy foil. One sheet was used for measuring the strength of the foil. The other sheet was immersed in an aqueous solution containing 3% of hydrochloric acid and 0.5% of oxalic acid and having a temperature of 60° C. and etched for 1.5 minutes by passing an alternating current through the solution at a current density of 30 A/dm$^2$. The capacitance of the foil was then measured.

TABLE 1

| Alloy | Purity of Al material (%) | Composition (%) | | |
|---|---|---|---|---|
| | | Al | Cu | Fe | Si |
| Example 1 | 99.85 | Balance | 0.30 | 0.10 | 0.05 |
| Example 2 | 99.77 | Balance | 0.45 | 0.15 | 0.08 |
| Example 3 | 99.83 | Balance | 0.10 | 0.10 | 0.07 |

COMPARISON EXAMPLES 1-3

Table 2 shows the compositions of three kinds of aluminum alloys used. A slab was prepared from each of alloys 1 and 2 by a semi-continuous casting process, and two sheets of alloy foil were formed from the slab by the usual foil forming method. On the other hand, a plate up to 25 mm in thickness was produced from alloy 3 by a continuous casting-rolling process, and the plate was cold-rolled and further rolled for foil forming to obtain two sheets of alloy foil. One sheet of each of these three alloy foils was used for measuring the strength of the foil. The other sheet was immersed in an aqueous solution having a temperature of 60° C. and containing 3% of hydrochloric acid and 0.5% of oxalic acid and was etched for 1.5 minutes by passing an alternating current through the solution at a current density of 30 A/dm$^2$. The capacitance of the foil was then measured.

TABLE 2

| Alloy | Purity of Al material (%) | Composition (%) | | | |
|---|---|---|---|---|---|
| | | Al | Cu | Fe | Si |
| Comp. Ex. 1 | — | Balance | 0.01> | 0.30 | 0.20 |
| Comp. Ex. 2 | 99.85 | Balance | 0.30 | 0.10 | 0.05 |
| Comp. Ex. 3 | — | Balance | 0.01> | 0.10 | 0.10 |

Table 3 shows the results of Examples 1-3 and Comparison Examples 1-3.

TABLE 3

| | Capacitance (μF/cm$^2$) | Strength (kg/cm$^2$) |
|---|---|---|
| Example 1 | 270 | 33.5 |
| Example 2 | 260 | 33.8 |
| Example 3 | 258 | 32.5 |
| Comp. Ex. 1 | 170 | 20.0 |
| Comp. Ex. 2 | 230 | 28.5 |
| Comp. Ex. 3 | 190 | 22.0 |

Table 3 reveals that the aluminum alloy foils prepared from the continuously cast aluminum alloy plates containing 0.03 to 0.5% of copper are apparently higher than the others in capacitance and strength.

EXAMPLES 4-7

A plate up to 25 mm in thickness was prepared by a continuous casting-rolling process from each of four kinds of aluminum alloys having the compositions listed in Table 4. The plate was checked for cracking. The plate was then cold-rolled and further rolled for foil forming to prepare two sheets of aluminum alloy foil. One sheet was used for measuring the strength of the foil. The other sheet was immersed in an aqueous solution having a temperature of 60° C. and containing 3% of hydrochloric acid and 0.5% of oxalic acid and was etched for 1.5 minutes by passing an alternating current through the solution at a current density of 30 A/dm$^2$. The capacitance of the foil was then measured.

TABLE 4

| Alloy | Purity of Al material (%) | Composition (%) | | | | |
|---|---|---|---|---|---|---|
| | | Al | Cu | Ti | Fe | Si |
| Ex. 4 | 99.85 | Balance | 0.30 | 0.008 | 0.10 | 0.05 |
| Ex. 5 | 99.80 | Balance | 0.45 | 0.005 | 0.15 | 0.05 |
| Ex. 6 | 99.72 | Balance | 0.10 | 0.04 | 0.20 | 0.08 |
| Ex. 7 | 99.90 | Balance | 0.08 | 0.02 | 0.06 | 0.04 |

COMPARISON EXAMPLES 4-6

Table 5 shows the compositions of three kinds of aluminum alloys 4 to 6 used. A slab was prepared from each of alloys 4 and 6 by a semi-continuous casting process. The slab was checked for cracking. Two sheets of alloy foil were then formed from the slab by the usual foil forming method. On the other hand, a plate up to 25 mm in thickness was produced from alloy 5 by a continuous casting-rolling process and checked for cracking. The plate was cold-rolled and further rolled for foil forming to obtain two sheets of alloy foil. One sheet of each of these three alloy foils was used for measuring the strength of the foil. The other sheet was immersed in an aqueous solution having a temperature of 60° C. and containing 3% of hydrochloric acid and 0.5% of oxalic acid and was etched for 1.5 minutes by passing an alternating current through the solution as a current density of 30 A/dm$^2$. The capacitance of the foil was then measured.

TABLE 5

| Alloy | Purity of Al material (%) | Composition (%) | | | | |
|---|---|---|---|---|---|---|
| | | Al | Cu | Ti | Fe | Si |
| Comp. Ex. 4 | — | Balance | 0.01> | 0.002> | 0.30 | 0.20 |
| Comp. Ex. 5 | — | Balance | 0.10 | 0.002> | 0.15 | 0.08 |
| Comp. Ex. 6 | 99.80 | Balance | 0.30 | 0.005 | 0.10 | 0.10 |

Table 6 shows the results of Examples 4-7 and Comparison Examples 4-6.

TABLE 6

| Alloy | Cracking | Capacitance (μF/cm$^2$) | Strength (kg/cm$^2$) |
|---|---|---|---|
| Example 4 | None | 270 | 33.5 |
| Example 5 | None | 260 | 34.5 |
| Example 6 | None | 255 | 32.8 |
| Example 7 | None | 265 | 31.9 |
| Comp. Ex. 4 | None | 170 | 20.0 |
| Comp. Ex. 5 | Cracking | 245 | 32.6 |

TABLE 6-continued

| Alloy | Cracking | Capacitance ($\mu F/cm^2$) | Strength ($kg/cm^2$) |
|---|---|---|---|
| Comp. Ex. 6 | None | 230 | 30.0 |

Table 6 reveals that Comparison Examples 4–6 produce poor results in respect of the cracking of the alloy material in the film forming process or the capacitance and strength of the foil product, whereas Examples 4–7 which used aluminum materials more than 99.7% in purity and alloys containing copper and titanium in specified amounts achieved good results in respect of the anti-cracking property of the continuously cast plate obtained in the foil forming process and also the capacitance and strength of the foil.

What is claimed is:

1. A cathod foil for an electrolytic capacitor which comprises an aluminum alloy foil having a capacitance of at least about 255 $\mu F/cm^2$ and produced by continuously casting an aluminum alloy in the form of a plate having a thickness of 25 mm or less using a twin roll continuous casting system, cold rolling and foil-forming rolling the plate into a foil, and acid-etching the foil, said aluminum alloy consisting essentially of aluminum having a purity of at least 99.7% and 0.03 to 0.5% copper.

2. A cathode foil as defined in claim 1 wherein the aluminum alloy contains 0.1 to 0.3% of copper.

3. A cathode foil as defined in claim 1 wherein the aluminum alloy further contains 0.002 to 0.05% of titanium.

4. A cathode foil as defined in claim 3 wherein the aluminum alloy contains 0.1 to 0.3% of copper.

5. A cathode foil as defined in claim 3 wherein the aluminum alloy contains 0.005 to 0.01% of titanium.

6. A cathod foil as defined in claim 4 wherein the aluminum alloy contains 0.005 to 0.01% of titanium.

7. A cathode foil as defined in any one of claims 1 and 2 to 6 wherein the aluminum alloy contains as impurities iron and silicon in a combined amount of up to 0.3%.

8. A cathode foil as defined in claim 1 wherein the aluminum has a purity of at least 99.85%.

9. A cathode foil as defined in claim 1 wherein the foil is subjected to an etching step.

10. A cathode foil as defined in claim 1 wherein following the cold-rolling step and prior to the foil-forming rolling step the aluminum alloy is subjected to an annealing step.

* * * * *